United States Patent
Yamada

(10) Patent No.: US 10,701,328 B2
(45) Date of Patent: Jun. 30, 2020

(54) IMAGE PROCESSING DEVICE, IMAGE PROCESSING METHOD, AND IMAGE PROCESSING PROGRAM

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 104 days.

(21) Appl. No.: 16/158,721

(22) Filed: Oct. 12, 2018

(65) Prior Publication Data

US 2019/0191136 A1    Jun. 20, 2019

(30) Foreign Application Priority Data

Dec. 19, 2017 (JP) ................................ 2017-242373
Dec. 19, 2017 (JP) ................................ 2017-242374

(51) Int. Cl.
| | |
|---|---|
| *H04N 9/64* | (2006.01) |
| *H04N 9/04* | (2006.01) |
| *G06T 7/90* | (2017.01) |
| *G06T 7/00* | (2017.01) |
| *G06T 5/00* | (2006.01) |

(52) U.S. Cl.
CPC ............ *H04N 9/646* (2013.01); *G06T 5/001* (2013.01); *G06T 5/002* (2013.01); *G06T 5/005* (2013.01); *G06T 7/0002* (2013.01); *G06T 7/90* (2017.01); *H04N 9/0451* (2018.08); *G06T 2207/10024* (2013.01)

(58) Field of Classification Search
CPC ........ H04N 9/646; H04N 9/0451; G06T 7/90; G06T 7/0002; G06T 5/001; G06T 2207/10024
See application file for complete search history.

(56) References Cited

U.S. PATENT DOCUMENTS

| | | | | |
|---|---|---|---|---|
| 2007/0153341 | A1* | 7/2007 | Kang ....................... | H04N 1/58 358/529 |
| 2012/0082380 | A1* | 4/2012 | Fujiwara .................. | H04N 1/58 382/167 |

FOREIGN PATENT DOCUMENTS

JP    2015-211325 A    11/2015

* cited by examiner

*Primary Examiner* — Ruiping Li
(74) *Attorney, Agent, or Firm* — Nath, Goldberg & Meyer; Jerald L. Meyer

(57) ABSTRACT

A peripheral blown-out pixel counter counts the number of blown-out pixels in a block including a target pixel and peripheral pixels in image data. A G threshold setting unit sets a G threshold such that the G threshold is greater as the number of the blown-out pixels is larger. A (B–G) threshold setting unit sets a (B–G) threshold such that the (B–G) threshold is smaller as the number of the blown-out pixels is larger. A correction necessity determination unit determines that a color of the target pixel should be corrected when a G signal is determined to be smaller than the G threshold and a (B–G) value is determined to be greater than the (B–G) threshold. A color correction unit corrects at least the G signal and a B signal when the color of the target pixel should be corrected.

13 Claims, 4 Drawing Sheets

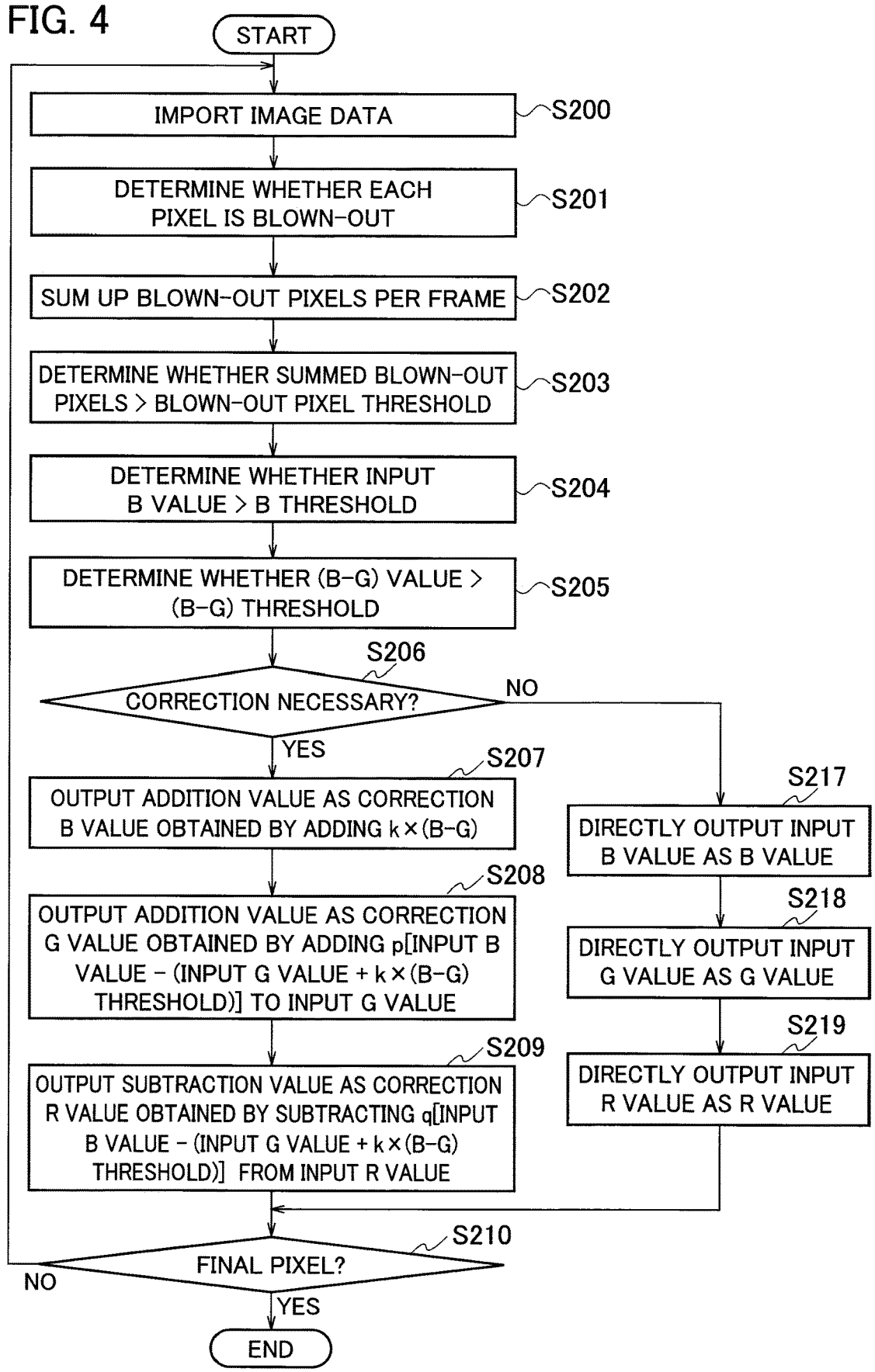

IMAGE PROCESSING DEVICE, IMAGE PROCESSING METHOD, AND IMAGE PROCESSING PROGRAM

CROSS REFERENCE TO RELATED APPLICATION

This application is based upon and claims the benefit of priority under 35 U.S.C. § 119 from Japanese Patent Application No. 2017-242373 filed on Dec. 19, 2017, and Japanese Patent Application No. 2017-242374 filed on Dec. 19, 2017, the entire contents of both of which are incorporated herein by reference.

BACKGROUND

The present disclosure relates to an image processing device, an image processing method, and an image processing program for detecting and reducing false color caused in a captured image.

Conventional imaging devices equipped with optical systems of high magnification using low-cost lenses sometimes cause false colors of purple or blue of high chroma. The false color may be shown in an image of an object at a portion with lower luminance adjacent to blown-out highlights when the object is captured by such an imaging device against the light. This type of false color is called purple fringing. Japanese Unexamined Patent Application Publication No. 2015-211325 discloses an image processing device which detects and reduces purple fringing.

SUMMARY

It is desirable to provide an image processing device, an image processing method, and an image processing program with a simple configuration capable of detecting and correcting false color.

A first aspect of one or more embodiments provides an image processing device including: a peripheral blown-out pixel counter configured to count a number of blown-out pixels in a block including a target pixel and peripheral pixels around the target pixel in image data including input R, G, and B signals; a G threshold setting unit configured to set a G threshold compared with a G signal in the target pixel such that the G threshold is greater as the number of the blown-out pixels is larger; a (B−G) threshold setting unit configured to set a (B−G) threshold compared with a (B−G) value obtained by subtracting the G signal from a B signal in the target pixel such that the (B−G) threshold is smaller as the number of the blown-out pixels is larger; a G threshold determination unit configured to determine whether the G signal in the target pixel is smaller than the G threshold; a (B−G) threshold determination unit configured to determine whether the (B−G) value in the target pixel is greater than the (B−G) threshold; a correction necessity determination unit configured to determine that a color of the target pixel should be corrected because the color is false when the G threshold determination unit determines that the G signal in the target pixel is smaller than the G threshold and the (B−G) threshold determination unit determines that the (B−G) value in the target pixel is greater than the (B−G) threshold; and a color correction unit configured to correct at least the G signal and the B signal in the target pixel so as to reduce the false color caused in the target pixel when the correction necessity determination unit determines that the color of the target pixel should be corrected.

A second aspect of one or more embodiments provides an image processing device including: a peripheral blown-out pixel counter configured to count a number of blown-out pixels in a block including a target pixel and peripheral pixels around the target pixel in image data including input R, G, and B signals; a G threshold determination unit configured to determine whether a G signal in the target pixel is smaller than a G threshold; a (B−G) threshold determination unit configured to determine whether a (B−G) value obtained by subtracting the G signal from a B signal in the target pixel is greater than a (B−G) threshold; a correction necessity determination unit configured to determine that a color of the target pixel should be corrected because the color is false when the G threshold determination unit determines that the G signal in the target pixel is smaller than the G threshold and the (B−G) threshold determination unit determines that the (B−G) value in the target pixel is greater than the (B−G) threshold; a B correction unit configured to output a first addition value, as a correction B value, obtained by adding a first multiplication value obtained by multiplying the (B−G) threshold by a first constant to the G signal in the target pixel when the correction necessity determination unit determines that the color of the target pixel should be corrected; and a G correction unit configured to output a second addition value, as a correction G value, obtained by adding a second multiplication value obtained by multiplying a difference between the B signal in the target pixel and the correction B value by a second constant to the G signal in the target pixel when the correction necessity determination unit determines that the color of the target pixel should be corrected.

A third aspect of one or more embodiments provides an image processing device including: a blown-out pixel determination unit configured to determine whether each of pixels in image data including input R, G, and B signals is blown-out; a blown-out pixel summation unit configured to sum up a number of pixels determined to be blown-out by the blown-out pixel determination unit in a frame or a part of the frame in the image data; a blown-out pixel threshold determination unit configured to determine whether the number of the pixels summed by the blown-out pixel summation unit exceeds a blown-out pixel threshold; a B threshold determination unit configured to determine whether a B signal in a target pixel is greater than a B threshold; a (B−G) threshold determination unit configured to determine whether a (B−G) value obtained by subtracting a G signal from the B signal in the target pixel is greater than a (B−G) threshold; a correction necessity determination unit configured to determine that a color of the target pixel should be corrected because the color is false when the blown-out pixel threshold determination unit determines that the number of the summed pixels exceeds the blown-out pixel threshold, the B threshold determination unit determines that the B signal in the target pixel is greater than the B threshold, and the (B−G) threshold determination unit determines that the (B−G) value in the target pixel is greater than the (B−G) threshold; and a color correction unit configured to correct at least the G signal and the B signal in the target pixel so as to reduce the false color caused in the target pixel when the correction necessity determination unit determines that the color of the target pixel should be corrected.

A fourth aspect of one or more embodiments provides an image processing method including: counting a number of blown-out pixels in a block including a target pixel and peripheral pixels around the target pixel in image data including input R, G, and B signals; setting a G threshold compared with a G signal in the target pixel such that the G threshold is greater as the number of the blown-out pixels is larger; setting a (B−G) threshold compared with a (B−G) value obtained by subtracting the G signal from a B signal in the target pixel such that the (B−G) threshold is smaller as the number of the blown-out pixels is larger; determining whether the G signal in the target pixel is smaller than the G threshold; determining whether the (B−G) value in the target pixel is greater than the (B−G) threshold; determining that a color of the target pixel should be corrected because the color is false when it is determined that the G signal in the target pixel is smaller than the G threshold and it is determined that the (B−G) value in the target pixel is greater than the (B−G) threshold; and correcting at least the G signal and the B signal in the target pixel so as to reduce the false color caused in the target pixel when it is determined that the color of the target pixel should be corrected.

A fifth aspect of one or more embodiments provides an image processing method including: counting a number of blown-out pixels in a block including a target pixel and peripheral pixels around the target pixel in image data including input R, G, and B signals; determining whether a G signal in the target pixel is smaller than a G threshold; determining whether a (B−G) value obtained by subtracting the G signal from a B signal in the target pixel is greater than a (B−G) threshold; determining that a color of the target pixel should be corrected because the color is false when it is determined that the G signal in the target pixel is smaller than the G threshold and it is determined that the (B−G) value in the target pixel is greater than the (B−G) threshold; outputting a first addition value, as a correction B value, obtained by adding a first multiplication value obtained by multiplying the (B−G) threshold by a first constant to the G signal in the target pixel when it is determined that the color of the target pixel should be corrected; and outputting a second addition value, as a correction G value, obtained by adding a second multiplication value obtained by multiplying a difference between the B signal in the target pixel and the correction B value by a second constant to the G signal in the target pixel when it is determined that the color of the target pixel should be corrected.

A sixth aspect of one or more embodiments provides an image processing method including: determining whether each of pixels in image data including input R, G, and B signals is blown-out; summing up a number of pixels determined to be blown-out in a frame or a part of the frame in the image data; determining whether the number of the summed pixels exceeds a blown-out pixel threshold; determining whether a B signal in a target pixel is greater than a B threshold; determining whether a (B−G) value obtained by subtracting a G signal from the B signal in the target pixel is greater than a (B−G) threshold; determining that a color of the target pixel should be corrected because the color is false when it is determined that the number of the summed pixels exceeds the blown-out pixel threshold, it is determined that the B signal in the target pixel is greater than the B threshold, and it is determined that the (B−G) value in the target pixel is greater than the (B−G) threshold; and correcting at least the G signal and the B signal in the target pixel so as to reduce the false color caused in the target pixel when it is determined that the color of the target pixel should be corrected.

A seventh aspect of one or more embodiments provides an image processing program stored in a non-transitory storage medium, the image processing program causing a computer to execute: a step of counting a number of blown-out pixels in a block including a target pixel and peripheral pixels around the target pixel in image data including input R, G, and B signals; a step of setting a G threshold compared with a G signal in the target pixel such that the G threshold is greater as the number of the blown-out pixels is larger; a step of setting a (B−G) threshold compared with a (B−G) value obtained by subtracting the G signal from a B signal in the target pixel such that the (B−G) threshold is smaller as the number of the blown-out pixels is larger; a step of determining whether the G signal in the target pixel is smaller than the G threshold; a step of determining whether the (B−G) value in the target pixel is greater than the (B−G) threshold; a step of determining that a color of the target pixel should be corrected because the color is false when it is determined that the G signal in the target pixel is smaller than the G threshold and it is determined that the (B−G) value in the target pixel is greater than the (B−G) threshold; and a step of correcting at least the G signal and the B signal in the target pixel so as to reduce the false color caused in the target pixel when it is determined that the color of the target pixel should be corrected.

A eighth aspect of one or more embodiments provides an image processing program stored in a non-transitory storage medium, the image processing program causing a computer to execute: a step of counting a number of blown-out pixels in a block including a target pixel and peripheral pixels around the target pixel in image data including input R, G, and B signals; a step of determining whether a G signal in the target pixel is smaller than a G threshold; a step of determining whether a (B−G) value obtained by subtracting the G signal from a B signal in the target pixel is greater than a (B−G) threshold; a step of determining that a color of the target pixel should be corrected because the color is false when it is determined that the G signal in the target pixel is smaller than the G threshold and it is determined that the (B−G) value in the target pixel is greater than the (B−G) threshold; a step of outputting a first addition value, as a correction B value, obtained by adding a first multiplication value obtained by multiplying the (B−G) threshold by a first constant to the G signal in the target pixel when it is determined that the color of the target pixel should be corrected; and a step of outputting a second addition value, as a correction G value, obtained by adding a second multiplication value obtained by multiplying a difference between the B signal in the target pixel and the correction B value by a second constant to the G signal in the target pixel when it is determined that the color of the target pixel should be corrected.

A ninth aspect of one or more embodiments provides an image processing program stored in a non-transitory storage medium, the image processing program causing a computer to execute: a step of determining whether each of pixels in image data including input R, G, and B signals is blown-out; a step of summing up a number of pixels determined to be blown-out in a frame or a part of the frame in the image data; a step of determining whether the number of the summed pixels exceeds a blown-out pixel threshold; a step of determining whether a B signal in a target pixel is greater than a B threshold; a step of determining whether a (B−G) value obtained by subtracting a G signal from the B signal in the target pixel is greater than a (B−G) threshold; a step of determining that a color of the target pixel should be corrected because the color is false when it is determined that the number of the summed pixels exceeds the blown-out pixel threshold, it is determined that the B signal in the target pixel is greater than the B threshold, and it is determined that the (B−G) value in the target pixel is greater than the (B−G) threshold; and a step of correcting at least the G signal and the B signal in the target pixel so as to reduce the false color caused in the target pixel when it is determined that the color of the target pixel should be corrected.

BRIEF DESCRIPTION OF THE DRAWINGS

FIG. 4 is a flowchart illustrating an operating process of the image processing device according to a second embodiment.

DETAILED DESCRIPTION

Image processing devices according to first and second embodiments are described below with reference to the accompanying drawings.

First Embodiment

Purple fringing, which is a phenomenon of false color of purple or blue of high chroma, is caused around a blown-out pixel where a G signal of R (red), G (green), and B (blue) signals is less than a fixed value, and the B signal is greater than the G signal by a predetermined value. An image processing device 100 according to a first embodiment detects purple fringing and corrects the color to reduce the purple fringing when the G signal is less than a fixed value and the B signal is greater than the G signal by a predetermined value.

Figure 1:
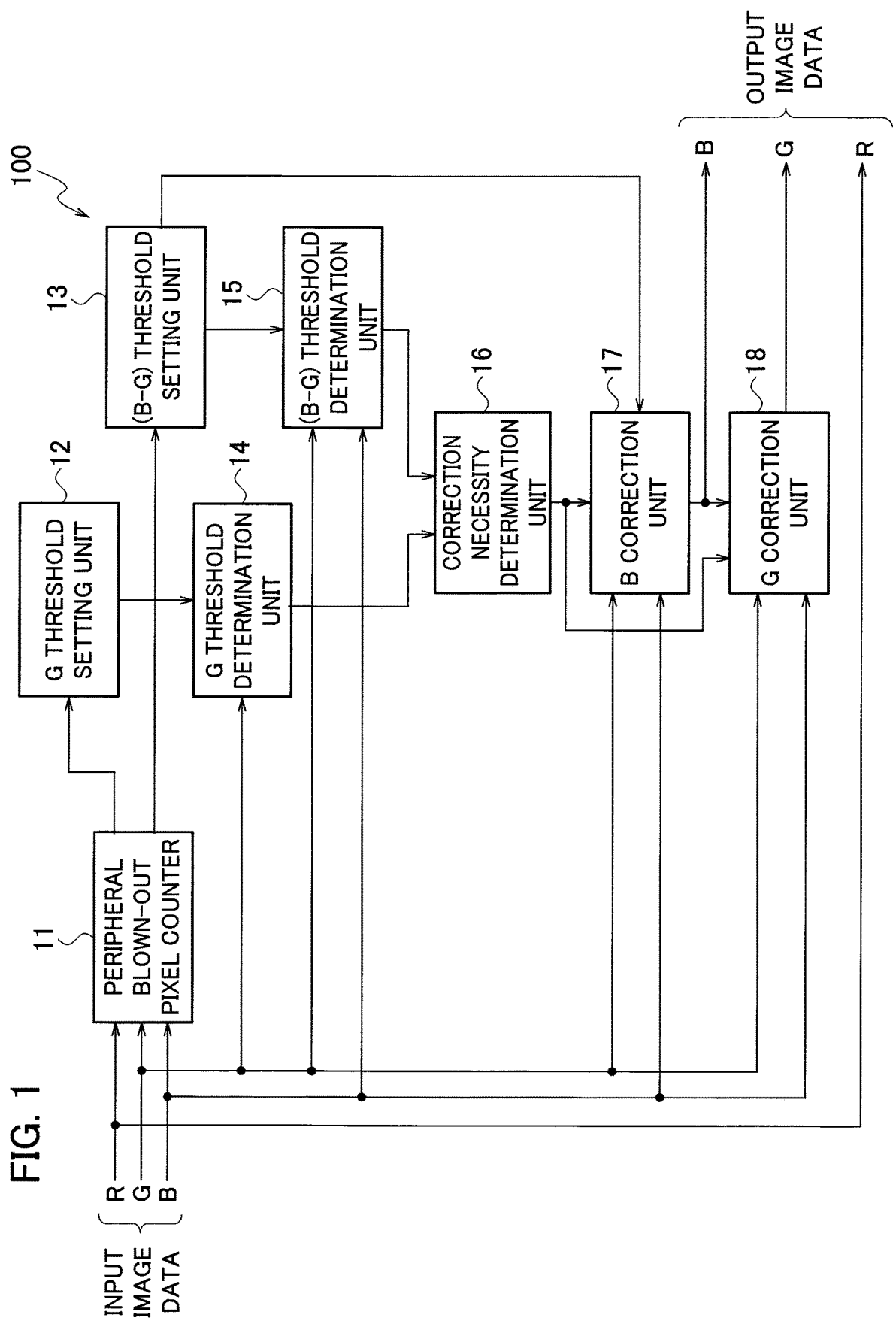
FIG. 1 is a block diagram illustrating an image processing device according to a first embodiment.

The image processing device 100 according to a first embodiment shown in FIG. 1 receives input image data of a captured image generated when an imaging device captures an object. The input image data is a digital image signal of a static or video image composed of R, G, and B signals. The input image data is quantized to eight bits. Each of the pixel values is any of zero to 255. Hereinafter, pixel values of R, G, and B signals in a target pixel are referred to as an input R value, an input G value, and an input B value.

The R, G, and B signals are input to a peripheral blown-out pixel counter 11 shown in FIG. 1. The peripheral blown-out pixel counter 11 determines that a pixel in which all of the R, G, and B signals exceed a predetermined threshold is a blown-out pixel within a block of (N×N) pixels including the target pixel and pixels around the target pixel, and counts the number of blown-out pixels. The threshold is 220, for example. The number of N may be any number in a range of three to 100 depending on a calculation resource or an image size.

A count value wh_num counted by the peripheral blown-out pixel counter 11 is supplied to a G threshold setting unit 12 and a (B−G) threshold setting unit 13. The G threshold setting unit 12 sets a G threshold, which is compared with the input G value, based on A×wh_num+B.

For example, when the number of N is 51, the number of A may be selected from 0.03 to 0.1, and the number of B may be selected from 50 to 150. The reason the number of A is set to a positive number is to increase the G threshold in accordance with the count value wh_num, since the probability is high that the input G value increases as the number of blown-out pixels around the target pixel is larger.

The (B−G) threshold setting unit 13 sets a (B−G) threshold, which is compared with a (B−G) value obtained by subtracting the input G value from the input B value, based on C×wh_num+D.

For example, when the number of N is 51, the number of C may be selected from −0.1 to −0.02, and the number of D may be selected from 60 to 120. The reason the number of C is set to a negative number is to decrease the (B−G) threshold in accordance with the count value wh_num, since the probability is high that the input G value and the input B value are closer to saturation, and the (B−G) value decreases as the number of blown-out pixels around the target pixel is larger.

The G signal and the G threshold are supplied to a G threshold determination unit 14. The G signal, the B signal, and the (B−G) threshold are supplied to a (B−G) threshold determination unit 15. The G threshold determination unit 14 determines whether the input G value is smaller than the G threshold (the input G value<the G threshold). The (B−G) threshold determination unit 15 determines whether the (B−G) value is greater than the (B−G) threshold (the (B−G) value>the (B−G) threshold). The determination results determined by the G threshold determination unit 14 and the (B−G) threshold determination unit 15 are supplied to a correction necessity determination unit 16.

The correction necessity determination unit 16 determines that purple fringing is caused in the target pixel and the target pixel thus should be corrected when the G threshold determination unit 14 determines that the condition of the input G value<the G threshold is satisfied, and the (B−G) threshold determination unit 15 determines that the condition of the (B−G) value>the (B−G) threshold is satisfied. The determination result of the correction necessity determined by the correction necessity determination unit 16 is supplied to a B correction unit 17 and a G correction unit 18, which are color connection units. The B signal and the G signal are supplied to the B correction unit 17 and the G correction unit 18.

The B correction unit 17 outputs an addition value, as a correction B value, obtained by adding a value of k×the (B−G) threshold to the input G value when the correction necessity determination unit 16 determines that the correction is necessary. The correction B value is a first addition value obtained by adding, to the input G value, a first multiplication value obtained by multiplying the (B−G) threshold by the first constant k. The correction B value is output from the image processing device 100 and is also supplied to the G correction unit 18. The constant k is a value of about 0.3 to 0.9, which may be determined in view of the balance of the entire color after correction.

The B correction unit 17 directly outputs the input B value when the correction necessity determination unit 16 determines that the correction is not necessary.

The correction of the B value by the B correction unit 17 can lead a difference between the correction B value and the input G value not to exceed the (B−G) threshold. When the coefficient k is 1.0, the difference between the correction B value and the input G value conforms to the (B−G) threshold.

The G correction unit 18 outputs an addition value as a correction G value obtained by adding, to the input G value, a value of p [the input B value−(the input G value+k×the (B−G) threshold)] obtained by multiplying a difference between the input B value and the correction B value by a constant p. The correction G value is a second addition value obtained by adding, to the input G value, a second multiplication value obtained by multiplying the difference between the input B value and the correction B value by the second constant p. The correction G value is output from the image processing device 100. The constant p is a value of about 0.05 to 0.3, which may be determined in view of the balance of the entire color after correction.

The G correction unit 18 directly outputs the input G value when the correction necessity determination unit 16 determines that the correction is not necessary.

The correction of the G value by the G correction unit 18 can allow the target pixel, of which the input B value is close to saturation and the input G value is small, to approximate to neutral white without excessively strong correction of redness.

The input R value in FIG. 1 is directly output from the image processing device 100. When purple fringing is caused, the input G value and the input B value are corrected so as to be output as the correction G value and the correction B value. The input R value, the correction G value, and the correction B value are output from the image processing device 100 as output image data. When purple fringing is not caused, the input R value, the input G value, and the input B value are directly output from the image processing device 100 as output image data.

Although not shown in FIG. 1, the input R value, the correction G value, and the correction B value (or the input R value, the input G value, and the input B value) are output while the mutual timings of the respective values conform to each other as necessary. The input R value is delayed before output for a period necessary for generating the correction G value and the correction B value, or the input R value, the correction G value, and the correction B value are temporarily stored in a storage unit before output.

Figure 2:
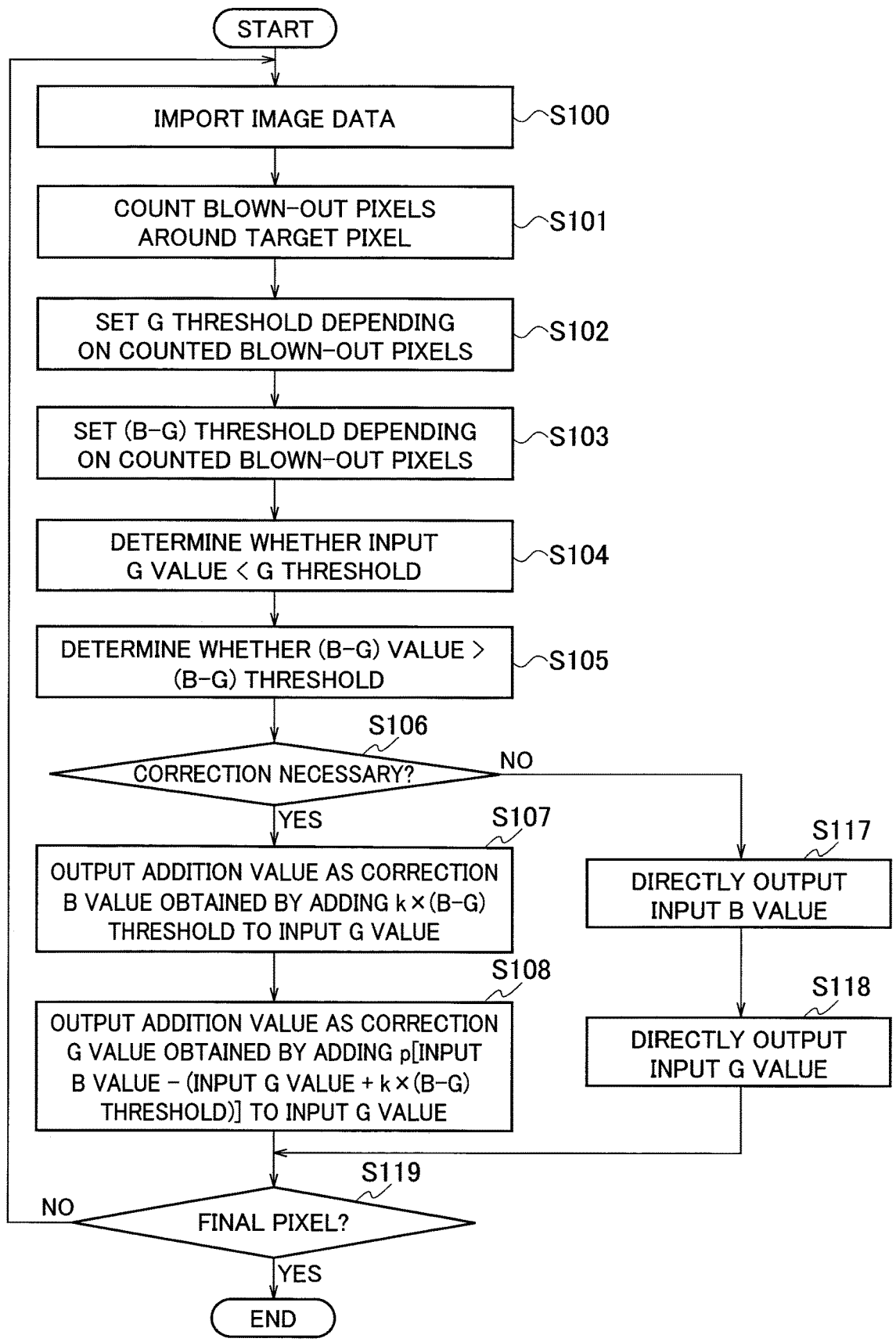
FIG. 2 is a flowchart illustrating an operating process of the image processing device according to a first embodiment.

The operation of (the image processing method for) the image processing device 100 according to a first embodiment is described in detail below with reference to the flowchart shown in FIG. 2. The image processing device 100, once starting operation, imports image data in step S100 in FIG. 2. The image data may be either a static image or a video image.

The peripheral blown-out pixel counter 11 counts the number of blown-out pixels around the target pixel in step S101. The G threshold setting unit 12 sets the G threshold depending on the number of the blown-out pixels in step S102. The (B−G) threshold setting unit 13 sets the (B−G) threshold depending on the number of the blown-out pixels in step S103. Step S103 may be performed before step S102, or step S102 and step S103 may be performed simultaneously.

The G threshold determination unit 14 determines whether the condition of the input G value<the G threshold is satisfied in step S104. The (B−G) threshold determination unit 15 determines whether the condition of the (B−G) value>the (B−G) threshold is satisfied in step S105. Step S105 may be performed before step S104, or step S104 and step S105 may be performed simultaneously.

The correction necessity determination unit 16 determines whether the target pixel should be corrected in step S106. The correction necessity determination unit 16 determines that the target pixel should be corrected when the conditions of the input G value<the G threshold and the (B−G) value>the (B−G) threshold are satisfied. The correction necessity determination unit 16 determines that the target pixel does not need to be corrected when the conditions are not satisfied.

When the target pixel should be corrected (YES) in step S106, the B correction unit 17 outputs the addition value, as the correction B value, obtained by adding the value of k×the (B−G) threshold to the input G value in step S107. The G correction unit 18 outputs the addition value, as the correction G value, obtained by adding the value of p [the input B value−(the input G value+k×the (B−G) threshold)] to the input G value in step S108. The image processing device 100 then causes the process to proceed to step S119. Step S108 may be performed before step S107, or step S107 and step S108 may be performed simultaneously.

When the target pixel does not need to be corrected (NO) in step S106, the B correction unit 17 directly outputs the input B value in step S117, and the G correction unit 18 directly outputs the input G value in step S118. The image processing device 100 then causes the process to proceed to step S119. Step S118 may be performed before step S117, or step S117 and step S118 may be performed simultaneously.

The image processing device 100 determines whether the target pixel is a final pixel in step S119. The image processing device 100 repeats the process from step S100 when the target pixel is not a final pixel (NO), or ends the process when the target pixel is a final pixel (YES). As used herein, the term "final pixel" refers to the last pixel in a frame of a static image, or refers to the last pixel in the last frame at a point when the input image data of a video image stops.

The above-described image processing device 100 according to a first embodiment can accurately detect the presence or absence of purple fringing with a simple configuration including the peripheral blown-out pixel counter 11 to the correction necessity determination unit 16.

Instead of the correction of the input B value and the input G value by the B correction unit 17 and the G correction unit 18, the input B value and the input G value may be corrected by another method such as compensation processing with peripheral values, or chroma reduction processing. The correction of the input B value and the input G value by the B correction unit 17 and the G correction unit 18 as described above is preferable because the correction can reduce purple fringing with less deterioration of picture quality.

Second Embodiment

Purple fringing is caused under the condition that a degree of saturation of a B signal is high, and thus can be a phenomenon that the B signal is greater than or equal to a fixed value and greater than a G signal by a predetermined value caused around a blown-out pixel. An image processing device 200 according to a second embodiment detects purple fringing and corrects the color to reduce the purple fringing when the B signal is greater than or equal to a fixed value and greater than the G signal by a predetermined value.

While a first embodiment counts the number of blown-out pixels around a target pixel, a second embodiment detects blown-out highlights when the number of blown-out pixels exceeds a predetermined value in a single frame.

Figure 3:
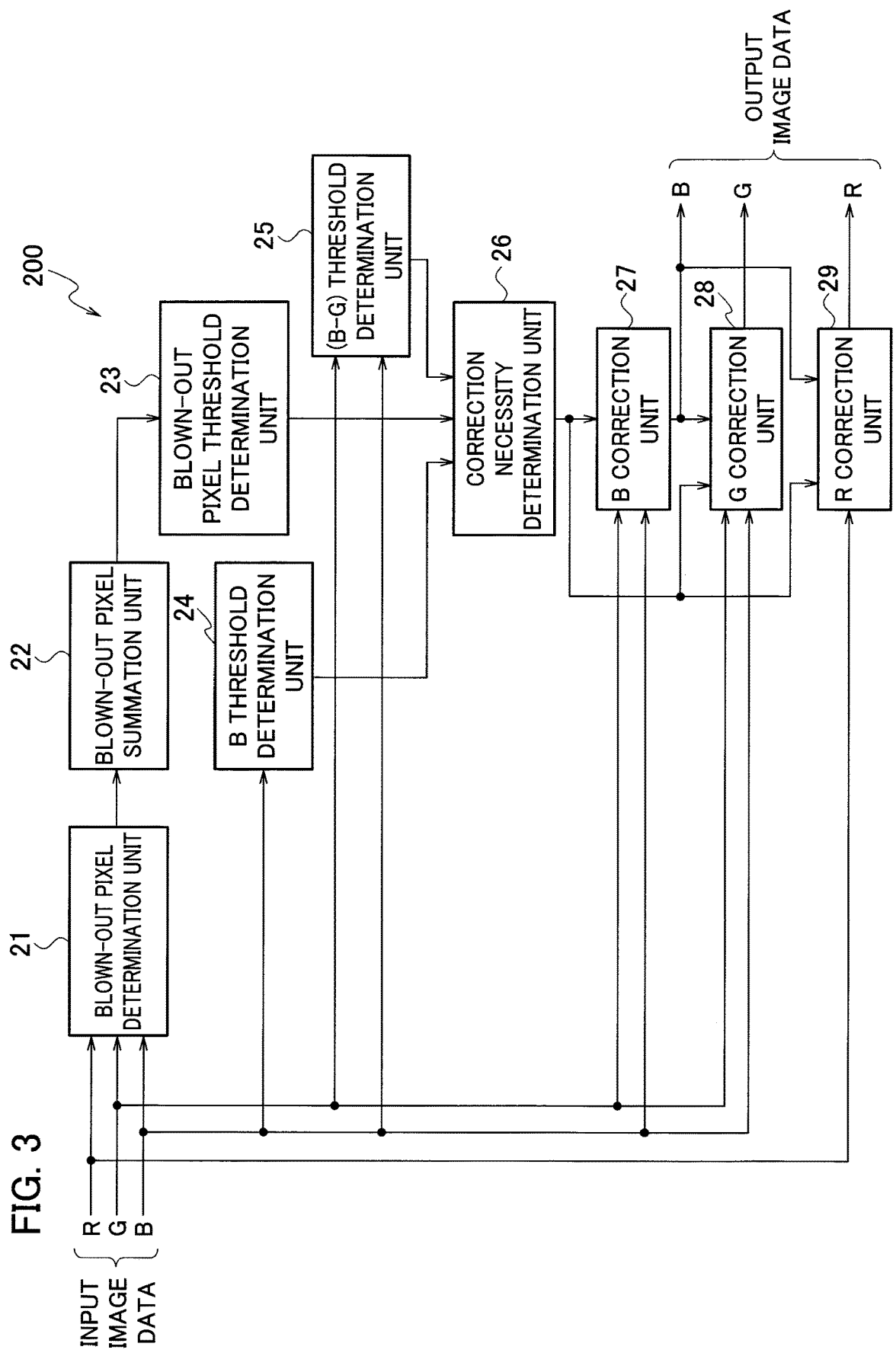
FIG. 3 is a block diagram illustrating an image processing device according to a second embodiment.

The image processing device 200 according to a second embodiment shown in FIG. 3 receives input image data of a captured image generated when an imaging device captures an object. In a second embodiment, the input image data is a digital image signal of a video image composed of R, G, and B signals. The input image data is quantized to eight bits. Each of the pixel values is any of zero to 255. Hereinafter, pixel values of R, G, and B signals in a target pixel are referred to as an input R value, an input G value, and an input B value.

A blown-out pixel determination unit 21 shown in FIG. 3 determines whether all of input R, G, and B input values in each pixel exceed a predetermined threshold, and determines that pixels in which all of R, G, and B input values exceed the predetermined threshold are blown-out. The threshold is 220, for example. The determination result per pixel determined by the blown-out pixel determination unit 21 is supplied to a blown-out pixel summation unit 22. The blown-out pixel summation unit 22 sums up the number of pixels determined to be blown-out in each frame. The number of the blown-out pixels summed by the blown-out pixel summation unit 22 is supplied to a blown-out pixel threshold determination unit 23.

The blown-out pixel summation unit 22 may sum up the number of pixels determined to be blown-out in the entire frame, or sum up the number of pixels determined to be blown-out in apart of the frame.

The blown-out pixel threshold determination unit 23 determines whether the number of the blown-out pixels summed exceeds a blown-out pixel threshold. The blown-out pixel threshold may be set to about several percent (one to nine percent) of all pixels in each frame. The determination result determined by the blown-out pixel threshold determination unit 23 is supplied to a correction necessity determination unit 26.

Since the number of the blown-out pixels summed by the blown-out pixel summation unit 22 is obtained per frame, the timing when the determination result determined by the blown-out pixel threshold determination unit 23 is supplied to the correction necessity determination unit 26 is after all pixels in a single frame are input. The correction necessity determination unit 26 thus determines whether the target pixel should be corrected in the subsequent frame in accordance with the determination result determined by the blown-out pixel threshold determination unit 23. Namely, the correction necessity determination unit 26 determines the necessity of correction of the target pixel using the determination result in the previous frame.

The B signal is supplied to a B threshold determination unit 24. The B threshold determination unit 24 stores a B threshold compared with the input B value. The B threshold may be about 120, for example. The B threshold determination unit 24 determines whether the input B value is greater than the B threshold (the input B value>the B threshold). The B threshold determination unit 24 determines whether the condition of the input B value>the B threshold is satisfied in a current frame, and the determination result is used in the subsequent frame as described above. The determination result determined by the B threshold determination unit 24 is supplied to the correction necessity determination unit 26.

The G signal and the B signal are supplied to a (B−G) threshold determination unit 25. The (B−G) threshold determination unit 25 stores a (B−G) threshold compared with a (B−G) value. The (B−G) threshold may be about 80, for example. The (B−G) threshold determination unit 25 determines whether the (B−G) value is greater than the (B−G) threshold (the (B−G) value>the (B−G) threshold). The (B−G) threshold determination unit 25 determines whether the condition of the (B−G) value>the (B−G) threshold is satisfied in the current frame. The determination result determined by the (B−G) threshold determination unit 25 is supplied to the correction necessity determination unit 26.

The correction necessity determination unit 26 determines that purple fringing is caused in the target pixel and the target pixel thus needs to be corrected when the blown-out pixel threshold determination unit 23 determines that the condition of the summed blown-out pixels>the blown-out pixel threshold is satisfied, the B threshold determination unit 24 determines that the condition of the input B value>the B threshold is satisfied, and the (B−G) threshold determination unit 25 determines that the condition of the (B−G) value>the (B−G) threshold is satisfied. The determination result determined by the correction necessity determination unit 26 is supplied to a B correction unit 27, a G correction unit 28, and an R correction unit 29, which are color correcting units.

The G signal and the B signal are supplied to the B correction unit 27 and the G correction unit 28. The R signal is supplied to the R correction unit 29.

The B correction unit 27 outputs an addition value, as a correction B value, obtained by adding a value of k×the (B−G) threshold to the input G value when the correction necessity determination unit 26 determines that the correction is necessary. The correction B value is a first addition value obtained by adding, to the input G value, a first multiplication value obtained by multiplying the (B−G) threshold by the first constant k. The correction B value is output from the image processing device 200 and is also supplied to the G correction unit 28 and the R correction unit 29. The constant k is a value of about 0.3 to 0.9, which may be determined in view of the balance of the entire color after correction.

The B correction unit 27 directly outputs the input B value when the correction necessity determination unit 26 determines that the correction is not necessary.

The correction of the B value by the B correction unit 27 can lead a difference between the correction B value and the input G value not to exceed the (B−G) threshold. When the coefficient k is 1.0, the difference between the correction B value and the input G value conforms to the (B−G) threshold.

The G correction unit 28 outputs an addition value as a correction G value obtained by adding, to the input G value, a value of p [the input B value−(the input G value+k×the (B−G) threshold)] obtained by multiplying a difference between the input B value and the correction B value by a constant p. The correction G value is a second addition value obtained by adding, to the input G value, a second multiplication value obtained by multiplying the difference between the input B value and the correction B value by the second constant p. The correction G value is output from the image processing device 200. The constant p is a value of about 0.05 to 0.3, which may be determined in view of the balance of the entire color after correction.

The G correction unit 28 directly outputs the input G value when the correction necessity determination unit 26 determines that the correction is not necessary.

The correction of the G value by the G correction unit 28 can allow the target pixel, of which the input B value approaches saturation and the input G value is small, to approximate to neutral white without excessively strong correction of redness.

The R correction unit 29 outputs a subtraction value as a correction R value obtained by subtracting, from the input R value, a value of q [the input B value−(the input G value+k×the (B−G) threshold)] obtained by multiplying the difference between the input B value and the correction B value by a constant q. The correction R value is a subtraction value obtained by subtracting, from the input R value, a third multiplication value obtained by multiplying the difference between the input B value and the correction B value by the third constant q. The correction R value is output from the image processing device 200. The constant q is a value of about 0.05 to 0.1, which may be determined in view of the balance of the entire color after correction.

The R correction unit 29 directly outputs the input R value when the correction necessity determination unit 26 determines that the correction is not necessary.

The R correction unit 29 decreases the R value when the redness is still strong after the correction so as to cause the target pixel of which the input B value is close to saturation and the input G value is small to approximate to neutral white. The correction of the R value thus can lead the target pixel to have a more natural color.

When purple fringing is caused in FIG. 3, the correction R value, the correction G value, and the correction B value are output as output image data from the image processing device 200. When purple fringing is not caused, the input R value, the input G value, and the input B value are directly output from the image processing device 200 as output image data.

The correction R value, the correction G value, and the correction B value (or the input R value, the input G value, and the input B value) are output while the mutual timings of the respective values conform to each other as necessary in FIG. 3, as in the case of a first embodiment.

The operation of (the image processing method for) the image processing device 200 according to a second embodiment is described in detail below with reference to the flowchart shown in FIG. 4. The image processing device 200, once starting operation, imports image data in step S200 in FIG. 4. The image data is a video image.

The blown-out pixel determination unit 21 determines whether each pixel is blown-out in step S201. The blown-out pixel summation unit 22 sums up the number of blown-out pixels per frame in step S202. The blown-out pixel threshold determination unit 23 determines whether the condition of the summed blown-out pixels>the blown-out pixel threshold is satisfied in step S203.

The B threshold determination unit 24 determines whether the condition of the input B value>the B threshold is satisfied in step S204. The (B−G) threshold determination unit 25 determines whether the condition of the (B−G) value>the (B−G) threshold is satisfied in step S205.

The correction necessity determination unit 26 determines whether the target pixel should be corrected in step S206. The correction necessity determination unit 26 determines that the target pixel should be corrected when the conditions of the summed blown-out pixels>the blown-out pixel threshold, the input B value>the B threshold, and the (B−G) value>the (B−G) threshold are all satisfied.

When the target pixel should be corrected (YES) in step S206, the B correction unit 27 outputs the addition value, as the correction B value, obtained by adding the value of k×the (B−G) threshold to the input G value in step S207. The G correction unit 28 outputs the addition value, as the correction G value, obtained by adding the value of p [the input B value−(the input G value+k×the (B−G) threshold)] to the input G value in step S208. The R correction unit 29 outputs the subtraction value, as the correction R value, obtained by subtracting the value of q [the input B value−(the input G value+k×the (B−G) threshold)] from the input R value in step S209. The image processing device 200 then causes the process to proceed to step S210.

The order of step S207 to step S209 is optional, and step S207 to step S209 may be performed simultaneously.

When the target pixel does not need to be corrected (NO) in step S206, the B correction unit 27 directly outputs the input B value in step S217, the G correction unit 28 directly outputs the input G value in step S218, and the R correction unit 29 directly outputs the input R value in step S219. The image processing device 200 then causes the process to proceed to step S210.

The order of step S217 to step S219 is optional, and step S217 to step S219 may be performed simultaneously.

The image processing device 200 determines whether the target pixel is a final pixel in step S210. The image processing device 200 repeats the process from step S200 when the target pixel is not a final pixel (NO), or ends the process when the target pixel is a final pixel (YES). As used herein, the term "final pixel" refers to the last pixel in the last frame at a point when the input image data of the video image stops.

The above-described image processing device 200 according to a second embodiment can accurately detect the presence or absence of purple fringing with a simple configuration including the blown-out pixel determination unit 21 to the correction necessity determination unit 26.

Instead of the correction of the input B value, the input G value, and the input R value by the B correction unit 27, the G correction unit 28, and the R correction unit 29, the input B value, the input G value, and the input R value may be corrected by another method such as compensation processing with peripheral values, or chroma reduction processing. The correction of the input B value, the input G value, and the input R value by the B correction unit 27, the G correction unit 28, and the R correction unit 29 as described above is preferable because the correction can reduce purple fringing with less deterioration of picture quality.

Modified Example

The image processing device 100 according to a first embodiment determines whether the image includes blown-out highlights in accordance with the number of blown-out pixels around the target pixel. This is herein referred to as a first blown-out determination method. The image processing device 200 according to a second embodiment determines whether the image includes blown-out highlights in accordance with the number of blown-out pixels in the previous frame. This is herein referred to as a second blown-out determination method.

The image processing device 100 according to a first embodiment determines that purple fringing is caused when the G signal is less than a fixed value, and the B signal is greater than the G signal by a predetermined value. This is herein referred to as a first purple fringing determination method. The image processing device 200 according to a second embodiment determines that purple fringing is caused when the B signal is greater than or equal to a fixed value and greater than the G signal by a predetermined value. This is herein referred to as a second purple fringing determination method.

The image processing device 100 according to a first embodiment sets the G threshold and the (B−G) threshold to vary depending on the number of blown-out pixels, while the image processing device 200 according to a second embodiment sets the G threshold and the (B−G) threshold to be constant regardless of the number of blown-out pixels. The image processing device 100 according to a first embodiment corrects the G and B signals, while the image processing device 200 according to a second embodiment corrects the R, G, and B signals.

The image processing device 100 according to a first embodiment employs the combination of the first blown-out determination method, the first purple fringing determination method, the varying thresholds, and the correction of the G and B signals. The image processing device 200 according to a second embodiment employs the combination of the second blown-out determination method, the second purple fringing determination method, the constant thresholds, and the correction of the R, G, and B signals.

The image processing device may employ, as a modified example, any combination other than those in the first and second embodiments.

The present invention is not intended to be limited to first and second embodiments or the modified example described above, and various modifications and improvements can be made without departing from the scope of the present invention. The image processing device may be composed of either hardware or software. The use of hardware or software is optional.

The image processing device may be a large-scale integrated circuit (LSI) or a computer including a central processing unit (CPU) and a memory. A computer program (image processing program) stored in a memory may be executed by a CPU so as to implement the image processing device 100 according to a first embodiment, the image processing device 200 according to a second embodiment, or the image processing device according to the modified example. An image processing program may be stored in a non-transitory storage medium to be executed.

What is claimed is:

1. An image processing device comprising:
   a peripheral blown-out pixel counter configured to count a number of blown-out pixels in a block including a target pixel and peripheral pixels around the target pixel in image data including input R, G, and B signals;
   a G threshold setting unit configured to set a G threshold compared with a G signal in the target pixel such that the G threshold is greater as the number of the blown-out pixels is larger;
   a (B−G) threshold setting unit configured to set a (B−G) threshold compared with a (B−G) value obtained by subtracting the G signal from a B signal in the target pixel such that the (B−G) threshold is smaller as the number of the blown-out pixels is larger;
   a G threshold determination unit configured to determine whether the G signal in the target pixel is smaller than the G threshold;
   a (B−G) threshold determination unit configured to determine whether the (B−G) value in the target pixel is greater than the (B−G) threshold;
   a correction necessity determination unit configured to determine that a color of the target pixel should be corrected because the color is false when the G threshold determination unit determines that the G signal in the target pixel is smaller than the G threshold and the (B−G) threshold determination unit determines that the (B−G) value in the target pixel is greater than the (B−G) threshold; and
   a color correction unit configured to correct at least the G signal and the B signal in the target pixel so as to reduce the false color caused in the target pixel when the correction necessity determination unit determines that the color of the target pixel should be corrected.

2. An image processing device comprising:
   a peripheral blown-out pixel counter configured to count a number of blown-out pixels in a block including a target pixel and peripheral pixels around the target pixel in image data including input R, G, and B signals;
   a G threshold determination unit configured to determine whether a G signal in the target pixel is smaller than a G threshold;
   a (B−G) threshold determination unit configured to determine whether a (B−G) value obtained by subtracting the G signal from a B signal in the target pixel is greater than a (B−G) threshold;
   a correction necessity determination unit configured to determine that a color of the target pixel should be corrected because the color is false when the G threshold determination unit determines that the G signal in the target pixel is smaller than the G threshold and the (B−G) threshold determination unit determines that the (B−G) value in the target pixel is greater than the (B−G) threshold;
   a B correction unit configured to output a first addition value, as a correction B value, obtained by adding a first multiplication value obtained by multiplying the (B−G) threshold by a first constant to the G signal in the target pixel when the correction necessity determination unit determines that the color of the target pixel should be corrected; and
   a G correction unit configured to output a second addition value, as a correction G value, obtained by adding a second multiplication value obtained by multiplying a difference between the B signal in the target pixel and the correction B value by a second constant to the G signal in the target pixel when the correction necessity determination unit determines that the color of the target pixel should be corrected.

3. The image processing device according to claim 2, further comprising an R correction unit configured to output a subtraction value, as a correction R value, obtained by subtracting a third multiplication value obtained by multiplying the difference between the B signal in the target pixel and the correction B value by a third constant from an R signal in the target pixel when the correction necessity determination unit determines that the color of the target pixel should be corrected.

4. An image processing device comprising:
   a blown-out pixel determination unit configured to determine whether each of pixels in image data including input R, G, and B signals is blown-out;
   a blown-out pixel summation unit configured to sum up a number of pixels determined to be blown-out by the blown-out pixel determination unit in a frame or a part of the frame in the image data;
   a blown-out pixel threshold determination unit configured to determine whether the number of the pixels summed by the blown-out pixel summation unit exceeds a blown-out pixel threshold;
   a B threshold determination unit configured to determine whether a B signal in a target pixel is greater than a B threshold;
   a (B−G) threshold determination unit configured to determine whether a (B−G) value obtained by subtracting a G signal from the B signal in the target pixel is greater than a (B−G) threshold;
   a correction necessity determination unit configured to determine that a color of the target pixel should be corrected because the color is false when the blown-out pixel threshold determination unit determines that the number of the summed pixels exceeds the blown-out pixel threshold, the B threshold determination unit determines that the B signal in the target pixel is greater than the B threshold, and the (B−G) threshold determination unit determines that the (B−G) value in the target pixel is greater than the (B−G) threshold; and
   a color correction unit configured to correct at least the G signal and the B signal in the target pixel so as to reduce the false color caused in the target pixel when the correction necessity determination unit determines that the color of the target pixel should be corrected.

5. The image processing device according to claim 4, wherein the color correction unit uses a first addition value, as a correction B value, obtained by adding a first multiplication value obtained by multiplying the (B−G) threshold by a first constant to the G signal in the target pixel.

6. The image processing device according to claim 5, wherein the color correction unit uses a second addition value, as a correction G value, obtained by adding a second multiplication value obtained by multiplying a difference between the B signal in the target pixel and the correction B value by a second constant to the G signal in the target pixel.

7. The image processing device according to claim 5, wherein:
the color correction unit corrects an R signal in the target pixel in addition to the B signal and the G signal; and
the color correction unit uses a subtraction value, as a correction R value, obtained by subtracting a third multiplication value obtained by multiplying a difference between the B signal in the target pixel and the correction B value by a third constant from the R signal in the target pixel.

8. An image processing method comprising:
counting a number of blown-out pixels in a block including a target pixel and peripheral pixels around the target pixel in image data including input R, G, and B signals;
setting a G threshold compared with a G signal in the target pixel such that the G threshold is greater as the number of the blown-out pixels is larger;
setting a (B−G) threshold compared with a (B−G) value obtained by subtracting the G signal from a B signal in the target pixel such that the (B−G) threshold is smaller as the number of the blown-out pixels is larger;
determining whether the G signal in the target pixel is smaller than the G threshold;
determining whether the (B−G) value in the target pixel is greater than the (B−G) threshold;
determining that a color of the target pixel should be corrected because the color is false when it is determined that the G signal in the target pixel is smaller than the G threshold and it is determined that the (B−G) value in the target pixel is greater than the (B−G) threshold; and
correcting at least the G signal and the B signal in the target pixel so as to reduce the false color caused in the target pixel when it is determined that the color of the target pixel should be corrected.

9. An image processing method comprising:
counting a number of blown-out pixels in a block including a target pixel and peripheral pixels around the target pixel in image data including input R, G, and B signals;
determining whether a G signal in the target pixel is smaller than a G threshold;
determining whether a (B−G) value obtained by subtracting the G signal from a B signal in the target pixel is greater than a (B−G) threshold;
determining that a color of the target pixel should be corrected because the color is false when it is determined that the G signal in the target pixel is smaller than the G threshold and it is determined that the (B−G) value in the target pixel is greater than the (B−G) threshold;
outputting a first addition value, as a correction B value, obtained by adding a first multiplication value obtained by multiplying the (B−G) threshold by a first constant to the G signal in the target pixel when it is determined that the color of the target pixel should be corrected; and
outputting a second addition value, as a correction G value, obtained by adding a second multiplication value obtained by multiplying a difference between the B signal in the target pixel and the correction B value by a second constant to the G signal in the target pixel when it is determined that the color of the target pixel should be corrected.

10. An image processing method comprising:
determining whether each of pixels in image data including input R, G, and B signals is blown-out;
summing up a number of pixels determined to be blown-out in a frame or a part of the frame in the image data;
determining whether the number of the summed pixels exceeds a blown-out pixel threshold;
determining whether a B signal in a target pixel is greater than a B threshold;
determining whether a (B−G) value obtained by subtracting a G signal from the B signal in the target pixel is greater than a (B−G) threshold;
determining that a color of the target pixel should be corrected because the color is false when it is determined that the number of the summed pixels exceeds the blown-out pixel threshold, it is determined that the B signal in the target pixel is greater than the B threshold, and it is determined that the (B−G) value in the target pixel is greater than the (B−G) threshold; and
correcting at least the G signal and the B signal in the target pixel so as to reduce the false color caused in the target pixel when it is determined that the color of the target pixel should be corrected.

11. An image processing program stored in a non-transitory storage medium, the image processing program causing a computer to execute:
a step of counting a number of blown-out pixels in a block including a target pixel and peripheral pixels around the target pixel in image data including input R, G, and B signals;
a step of setting a G threshold compared with a G signal in the target pixel such that the G threshold is greater as the number of the blown-out pixels is larger;
a step of setting a (B−G) threshold compared with a (B−G) value obtained by subtracting the G signal from a B signal in the target pixel such that the (B−G) threshold is smaller as the number of the blown-out pixels is larger;
a step of determining whether the G signal in the target pixel is smaller than the G threshold;
a step of determining whether the (B−G) value in the target pixel is greater than the (B−G) threshold;
a step of determining that a color of the target pixel should be corrected because the color is false when it is determined that the G signal in the target pixel is smaller than the G threshold and it is determined that the (B−G) value in the target pixel is greater than the (B−G) threshold; and
a step of correcting at least the G signal and the B signal in the target pixel so as to reduce the false color caused in the target pixel when it is determined that the color of the target pixel should be corrected.

12. An image processing program stored in a non-transitory storage medium, the image processing program causing a computer to execute:

a step of counting a number of blown-out pixels in a block including a target pixel and peripheral pixels around the target pixel in image data including input R, G, and B signals;

a step of determining whether a G signal in the target pixel is smaller than a G threshold;

a step of determining whether a (B−G) value obtained by subtracting the G signal from a B signal in the target pixel is greater than a (B−G) threshold;

a step of determining that a color of the target pixel should be corrected because the color is false when it is determined that the G signal in the target pixel is smaller than the G threshold and it is determined that the (B−G) value in the target pixel is greater than the (B−G) threshold;

a step of outputting a first addition value, as a correction B value, obtained by adding a first multiplication value obtained by multiplying the (B−G) threshold by a first constant to the G signal in the target pixel when it is determined that the color of the target pixel should be corrected; and a step of outputting a second addition value, as a correction G value, obtained by adding a second multiplication value obtained by multiplying a difference between the B signal in the target pixel and the correction B value by a second constant to the G signal in the target pixel when it is determined that the color of the target pixel should be corrected.

13. An image processing program stored in a non-transitory storage medium, the image processing program causing a computer to execute:

a step of determining whether each of pixels in image data including input R, G, and B signals is blown-out;

a step of summing up a number of pixels determined to be blown-out in a frame or a part of the frame in the image data;

a step of determining whether the number of the summed pixels exceeds a blown-out pixel threshold;

a step of determining whether a B signal in a target pixel is greater than a B threshold;

a step of determining whether a (B−G) value obtained by subtracting a G signal from the B signal in the target pixel is greater than a (B−G) threshold;

a step of determining that a color of the target pixel should be corrected because the color is false when it is determined that the number of the summed pixels exceeds the blown-out pixel threshold, it is determined that the B signal in the target pixel is greater than the B threshold, and it is determined that the (B−G) value in the target pixel is greater than the (B−G) threshold; and a step of correcting at least the G signal and the B signal in the target pixel so as to reduce the false color caused in the target pixel when it is determined that the color of the target pixel should be corrected.

* * * * *